(12) United States Patent
Check et al.

(10) Patent No.: US 7,178,881 B2
(45) Date of Patent: Feb. 20, 2007

(54) REAR PRESSURE CONTROL AND REAR DYNAMIC PROPORTIONING IN A VEHICLE BRAKE SYSTEM

(75) Inventors: Michael J. Check, Ann Arbor, MI (US); Joseph A. Elliott, Plymouth, MI (US)

(73) Assignee: Delphi Technologies, Inc., Troy, MI (US)

( * ) Notice: Subject to any disclaimer, the term of this patent is extended or adjusted under 35 U.S.C. 154(b) by 177 days.

(21) Appl. No.: 10/603,551

(22) Filed: Jun. 25, 2003

(65) Prior Publication Data

US 2004/0262990 A1  Dec. 30, 2004

(51) Int. Cl.
*B60T 8/18* (2006.01)

(52) U.S. Cl. ............ 303/9.69; 303/3; 303/191; 303/DIG. 2

(58) Field of Classification Search ............ 303/3, 303/5, 15, 9.62, 9.69, 138, 145, 150, 157, 303/158, 167, 191, 113.5, 119.1, 22.1, 22.2, 303/DIG. 2; 188/195, 349
See application file for complete search history.

(56) References Cited

U.S. PATENT DOCUMENTS

| | | | | |
|---|---|---|---|---|
| 3,862,781 A | * | 1/1975 | King et al. ........... | 303/9.69 |
| 4,445,725 A | * | 5/1984 | Sivulka ................ | 303/9.69 |
| 4,790,607 A | | 12/1988 | Atkins ................. | 303/195 |
| 4,886,322 A | | 12/1989 | Atkins ................. | 303/149 |
| 4,991,103 A | | 2/1991 | Lin .................... | 701/73 |
| 5,480,221 A | * | 1/1996 | Morita et al. .......... | 303/113.5 |
| 5,487,596 A | | 1/1996 | Negrin ................. | 303/149 |
| 6,193,327 B1 | | 2/2001 | Atkins ................. | 303/113.1 |
| 6,241,326 B1 | | 6/2001 | Ferguson et al. ........ | 303/177 |
| 6,357,840 B1 | | 3/2002 | Atkins ................. | 303/149 |
| 6,398,321 B1 | | 6/2002 | Atkins ................. | 303/158 |
| 6,546,324 B1 | | 4/2003 | Chen et al. | |

FOREIGN PATENT DOCUMENTS

| | | | |
|---|---|---|---|
| EP | 0246790 A2 | * | 11/1987 |
| JP | 11165624 A | * | 6/1999 |

\* cited by examiner

*Primary Examiner*—Melody M. Burch
(74) *Attorney, Agent, or Firm*—Scott A. McBain

(57) ABSTRACT

An apparatus and method are provided for controlling a rear brake hydraulic circuit having a fluid storage element and a master cylinder supplying a volume of pressurized brake fluid to the rear brakes during the braking cycle in a pump-less anti-lock brake apparatus controlling the rotational speeds, during a braking cycle, of only the rear brakes of a vehicle having at least one front wheel, at least one rear wheel, and front and rear brakes acting on the front and rear wheels respectively, by determining whether the vehicle is operating lightly loaded at a light vehicle weight (LVW) or heavily loaded at a gross vehicle weight (GVW), providing rear dynamic proportioning (RDP) when a predetermined deceleration rate is exceeded during the braking event with the vehicle operating at LVW, and inhibiting RDP when the vehicle is operating at GVW. The apparatus and method also provide rear pressure control (RPC) during anti-lock braking.

12 Claims, 7 Drawing Sheets

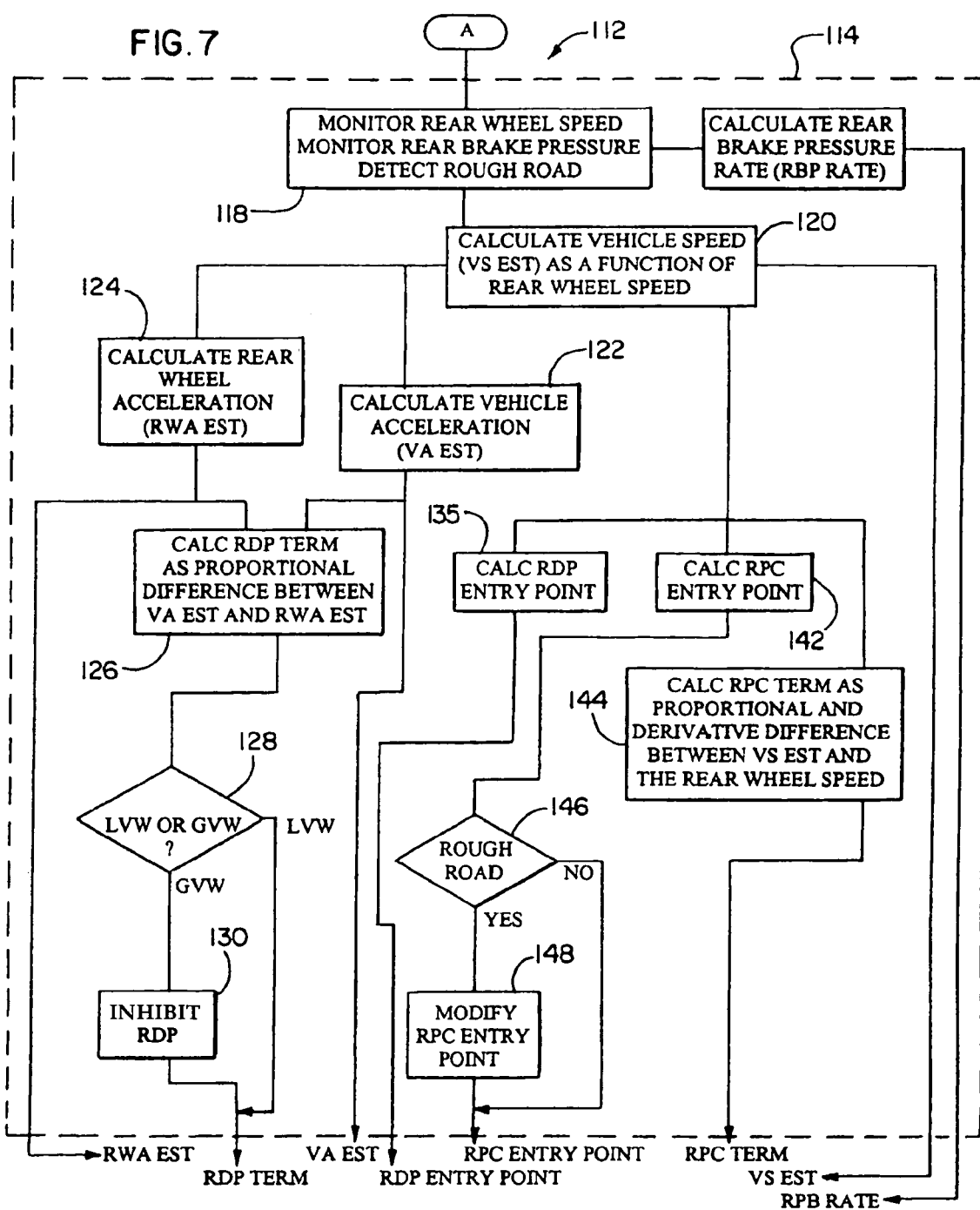

REAR PRESSURE CONTROL AND REAR DYNAMIC PROPORTIONING IN A VEHICLE BRAKE SYSTEM

TECHNICAL FIELD OF THE INVENTION

This invention relates to brake systems for vehicles, and more particularly to rear wheel anti-lock brake systems where pressurized fluid is provided by a master cylinder during both normal and anti-lock braking events.

BACKGROUND OF THE INVENTION

Maintaining directional control while stopping a four-wheeled vehicle skidding on a slippery surface, or in a panic stop situation where the vehicle operator is applying excessive pressure to the brake pedal, requires attention to a number of interrelated problems including: getting the vehicle stopped in a reasonable distance; maintaining steering control; and controlling a condition known as yaw, where the rear wheels of the vehicle break loose before the front wheels and the rear end of the vehicle swings around toward the front of the vehicle. If yaw is not controlled, the rear end of the vehicle may swing far enough around toward the front to cause the vehicle to spin, slide sideways into an obstacle, or even overturn.

Vehicles such as light trucks, which routinely operate with only minimal weight over the rear wheels when they are not carrying a load, present special problems for brake designers in dealing with yaw. The rear brakes must be capable of stopping the truck in a required distance, as specified in government regulations, while carrying a full load and operating at the full gross vehicle weight of the truck. When the truck is operating empty, however, because there is so little weight over the rear wheels, the rear wheels tend to break loose from the driving surface under much lighter brake loads than do the rear wheels of vehicles, such as passenger cars, where the vehicle weight is more evenly distributed to the front and rear wheels.

Modern all-wheel anti-lock (AWAL) brake systems provide improved directional stability in stopping a vehicle in a skidding situation. Such AWAL brake systems typically include an electronic control unit (ECU) that receives wheel speed signals from speed sensors on the front and rear wheels. The ECU detects the impending onset of wheel lock-up by monitoring the speed of the wheels. When an impending lock-up is detected, the ECU takes control of the AWAL brake system, and rapidly pulses the brakes to prevent the brakes from locking the wheels, so that some measure of control is retained even if the braking surface is too slippery to allow normal braking.

When an impending lock-up is detected, the ECU actuates an AWAL isolation valve to close off the hydraulic connection between the brakes and the master cylinder in the base brake system, and the AWAL brake system takes over control of the brakes. A circulation pump in the AWAL brake system takes the place of the master cylinder during the operation of the AWAL brake system, and supplies a continual flow of pressurized hydraulic fluid to the brakes through apply and release valves that are opened and closed at a rapid rate by the (ECU) to cause the fluid pressure in the brakes to pulsate and allow a staccato rotation of the wheel. By rapidly opening and closing the apply and release valves in this manner, the brake pressure applied to the wheels can be modulated and closely controlled to maintain wheel slip within precise limits to optimize stability, steerability and stopping distance of the vehicle.

Another function typically performed by an AWAL brake system is known as dynamic rear proportioning (DRP). In performing DRP, the ECU will monitor and compare the speeds of the front and rear wheels, and control the AWAL apply and release valves in a manner that limits the pressure applied to the rear brakes to a value proportionally lower than the pressure applied to the front brakes, so that the rear brakes will always be slipping a predetermined amount in relation to the front brakes. The object of DRP is to promote enhanced directional stability through yaw reduction during braking by ensuring that the rear wheels never lock up before the front wheels. Because the AWAL brake system continually monitors the speed of the front and rear wheels during DRP operation, the AWAL system can detect differences in stopping performance of a vehicle such as a light truck when it is operating empty or carrying a load, and adjust the proportion of brake pressure applied to the front and rear wheels accordingly.

Such AWAL brake systems with DRP add considerable complexity and cost to the brake system, due to the necessity for the pump and associated controls. This additional cost and complexity has precluded installation of four-wheel ABS systems as standard equipment on all four-wheeled vehicles.

For the last several decades, however, a significant percentage of light trucks and vans that are not equipped with an AWAL brake system have been equipped with pump-less anti-lock brake systems that operate only on the rear wheels of the vehicle. In the automotive industry, such systems are sometimes known as rear wheel anti-lock (RWAL) brake systems. These systems have been shown to offer significant improvements in directional stability during braking at a lower cost that a full AWAL brake system, because RWAL systems have fewer and less costly components than AWAL brake systems.

The following United States patents disclose examples of prior RWAL brake systems and methods for operating such systems: U.S. Pat. No. 4,790,607 to Atkins, et al; U.S. Pat. No. 4,886,322 to Atkins; U.S. Pat. No. 4,991,103 to Lin; U.S. Pat. No. 5,487,596 to Negrin; U.S. Pat. No. 6,193,327 B1 to Atkins; U.S. Pat. No. 6,241,326 B1 to Ferguson, et al; U.S. Pat. No. 6,357,840 B1 to Atkins; and U.S. Pat. No. 6,398,321 B1 to Atkins.

As shown in FIG. 1, an RWAL brake system 10 typically includes a pedal actuated master cylinder 12 having a primary piston supplying a first volume of pressurized hydraulic brake fluid to a front brake circuit 14 connected to brakes on the left and right front wheels of the vehicle, and a secondary piston supplying second volume of pressurized hydraulic fluid to a rear brake circuit 16 to the left and right rear wheels of the vehicle. The rear brake circuit 16 includes a normally open apply valve 18, a normally closed release valve 20, a fluid storage element in the form of an accumulator 22, and a differential pressure switch 24.

The apply valve 18 has an inlet connected to the master cylinder 12 and an outlet connected to the rear brakes. The release valve 20 has an inlet connected to the rear brakes and an outlet connected to the accumulator 22. The differential pressure 24 switch is operatively connected to sense the difference between the pressure in the rear brake circuit 16 at the inlet of the apply valve 18, as supplied by the master cylinder 12, and the pressure in the rear brakes, and to generate an electrical signal when a predetermined pressure differential is detected.

The RWAL system typically includes a single wheel speed sensor 26 attached to monitor speed of a component 28, such as a rotating gear or shaft in the transmission or the differential, of the power train connecting the rear wheels of the vehicle to the engine. The single rear wheel speed sensor 26 generates a signal that is indicative of, or proportional to, an average speed of the left and right rear wheels. The RWAL system also typically includes a brake switch 30, connected to the brake pedal or the linkage leading to a vacuum booster attached to the master cylinder 12, that generates a signal indicating that the driver has depressed the brake pedal and initiated a braking event. The RWAL system may also include other sensors, such as the fluid level sensor 32 shown in FIG. 1, for performing other diagnostic and control functions.

The RWAL system further includes an electronic control unit ECU 34 connected to the apply valve 18, the release valve 20, the single wheel speed sensor 26, the brake switch 30, and the differential pressure switch 24. The ECU 34 of the RWAL system receives the signals generated by the single wheel speed sensor 26, the brake switch 30, and the differential pressure switch 24 as input signals that are processed by the ECU 34, according to analytical functions programmed into the ECU 34, to determine if RWAL operation is required during a braking event. If RWAL operation is required, the ECU 34 generates output signals for controlling the apply valve 18 and release valves 20 during RWAL operation according to control functions programmed into the ECU 34.

In general, the ECU 34 of an RWAL system controls the apply and release valves 18, 20 during RWAL operation according to various hold and release sequences that allow the ECU 34 to detect when the rear wheels are experiencing a lock-up condition, and to control the rear brakes during RWAL operation.

To reduce pressure in the rear brakes during RWAL operation, the apply valve 18 is closed to isolate the master cylinder 12 from the rear brakes, and the release valve 20 is opened to allow a portion of the pressurized fluid originally supplied to the rear brakes by the master cylinder 12 to bleed off through release valve 20. The fluid released from the rear brakes through the release valve 20 is stored in the accumulator 22, and is returned to the master cylinder following the braking event, when the driver's foot is removed form the brake pedal, through a pair of check valves 36,38 connected to allow flow from the outlet to the inlet of the apply valve 18 and release valve 20 respectively. In actual operation, the apply and release valves 18, 20 are not simply opened or closed once in a braking event, but are rather pulsed open and closed at a rapid rate by the ECU 34 during RWAL operation.

Because there is no circulation pump in an RWAL brake system for providing a continuous flow of pressurized hydraulic brake fluid, as there would be with a full AWAL brake system, the maximum volume of pressurized fluid available to the rear brake circuit 16 of the RWAL brake system 10 is limited to the volume of fluid that is supplied to the rear brake circuit 16 by a single apply stroke of the master cylinder 12. As a result, RWAL operation will terminate when the accumulator 22 is full, or when a maximum allowable portion of the volume of fluid supplied by the master cylinder 12 has been bled into the accumulator 22. The ECU 34 will terminate RWAL operation and allow the rear wheels to lock up, or apply braking force with whatever residual pressure is available to the rear brakes from the master cylinder 12, when the signals received from the differential pressure switch 24 indicate that the accumulator 22 is full.

While it would seem logical at first consideration that one could indefinitely continue RWAL operation by providing an accumulator 22 capable of storing a large volume of fluid, this is not the case, due to the limited volume of pressurized fluid available from the master cylinder 12 for use during any given braking event. Furthermore, where the front brakes are not capable, without some contribution from the rear brakes, of providing sufficient braking force to meet government standards for minimum stopping distance, the maximum allowable volume of fluid that can be bled off into the accumulator during RWAL operation will be less than the total volume of pressurized fluid supplied by the master cylinder 12 during the braking event. Where the government standards for minimum stopping distance cannot be met without the rear brakes, RWAL operation must be discontinued when the remaining pressure in the rear brakes has dropped to a minimum value required to provide the braking force needed to augment the braking force generated by the front brakes.

It will be clear to those skilled in the art that, because there is no pump in an RWAL brake system for continually supplying and re-circulating pressurized fluid, as there would be in an AWAL brake system, one must adopt a different mindset when designing an RWAL brake system, and be very stingy about how the limited volume of pressurized fluid available from the master cylinder 12 is utilized during RWAL operation.

Unfortunately, prior RWAL brake systems having only a single rear wheel speed input must utilize a portion of this limited volume of pressurized fluid for periodically performing hold and release cycles to gather data needed for determining if the rear wheels are truly experiencing a lock-up condition, and for determining when the RWAL cycle should be terminated during a given braking cycle, such as, for example, because the rear wheels having passed over a slippery patch of road surface that caused initiation of the RWAL cycle, or because the wheels have slowed enough to re-engage whatever surface they may be traversing, or that braking pressure from the master cylinder 12 has been reduced to a level that lock-up will not occur, or that the RWAL cycle must be aborted during the remainder of the braking cycle because the limited volume of fluid available from the master cylinder 12 has been transferred to the accumulator 22. The pressurized fluid wasted in performing these functions reduces the length of time that the brake system can operate in RWAL mode, and limits the effectiveness of the RWAL system during a given braking event.

In addition, the re-apply time between subsequent RWAL brake operations is affected by factors such as the temperature and volume of the fluid in the accumulator 22, and residual pressure in the rear brakes, that must bleed back to the master cylinder 12 through the rear brake circuit 16, between subsequent braking events. Periodically performing hold and release cycling of the rear brakes to determine if RWAL operation is needed, and for control during RWAL operation can undesirably lengthen the re-apply time.

It is also not possible in prior RWAL brake systems 10 to perform true dynamic rear proportioning (DRP). Because prior RWAL brake systems 10 do not utilize front wheel speed, all information relating to vehicle speed must be deduced from instantaneous rear wheel speed signals provided by the rear wheel sensor 26.

Some prior RWAL systems have included a conventional hydraulic proportioning valve 17, of the type used for several decades in vehicles with standard brake systems, and in some vehicles with various types of controlled braking systems, to provide brake proportioning at a fixed rate. These systems do not provide DRP, because the brake proportioning is not dynamically controlled by the RWAL.

As shown in FIG. 1, for RWAL systems using such conventional hydraulic proportioning valves, the valve 17 is located in the rear brake circuit. The hydraulic proportioning valve 17 has an inlet 17a connected to the master cylinder 12, to receive pressurized fluid therefrom, and an outlet 17b connected to deliver the pressurized fluid from the master cylinder 12 to the rear brakes, through the apply valve 18.

A typical pressure profile curve for a conventional hydraulic proportioning valve 17 is shown in FIG. 2, with the horizontal axis representing the front brake pressure and the vertical axis representing rear brake pressure. The rear pressure tracks and is equal to the front pressure in the region labeled 5 until a "knee" "A" is reached. Beyond the knee "A" the increase in pressure applied to the rear brakes is limited to a fixed proportion of the pressure increase applied to the front brakes, as shown by the region labeled 7, by a spring-biased mechanism in the hydraulic proportioning valve 17, in a manner well known in the art.

U.S. Pat. No. 6,241,326 B1, to Ferguson, et al, discloses a system and method for electronically controlling an RWAL system in a manner that emulates the performance of a conventional fixed-rate hydraulic proportioning valve, using a process that Ferguson calls electronic brake proportioning (EBP), in an RWAL system that does not include a hydraulic proportioning valve. When operating in the EBP mode, Ferguson uses the RWAL ECU 34 to control the isolation valve 18 in a manner that provides a pressure profile curve that approximates the curve shown in FIG. 2.

Ferguson uses signals from a rear wheel speed sensor, and/or a g-sensor, to identify when the vehicle has reached the same predetermined static deceleration threshold, i.e. the knee of the pressure profile curve, (see, for example, point A at 0.55 g on FIGS. 3 and 4) that would be utilized to initiate conventional brake proportioning, if the RWAL brake system on the vehicle included a conventional hydraulic proportioning valve. As shown by the dashed 45° line 106, in FIGS. 2 and 3, at g-levels below the predetermined static brake threshold of 0.55 g at point A, the EBP function of Ferguson applies brake pressure equally to the front and rear brakes. Once the predetermined deceleration threshold, A at 0.55 g, is reached with the RWAL operating in the EBP mode, a subroutine in the RWAL control algorithm of Ferguson controls an isolation valve 18 to hold the pressure in the rear brake circuit at a constant value as the front brake pressure continues to increase. The EBP system periodically opens the isolation valve 18, according to a pre-programmed schedule, to distribute further brake pressure increases in open-loop stepwise fashion in increments of 0.1 g as the vehicle reaches higher deceleration thresholds (see points B at 0.65 g and C at 0.75 g) to approximate an idealized proportioning curve, as shown by curves 108 and 110 in FIGS. 2 and 3 respectively that emulates a pressure profile curve for a conventional hydraulic proportioning valve.

The EBP function of Ferguson does not provide 'dynamic' rear proportioning, but rather uses a pre-set routine of open and hold cycles of the isolation valve that may be wasteful of the limited volume of hydraulic fluid available from the master cylinder 12, and may also result in either under or over braking of the rear wheels under conditions where the pre-set routine of open and hold cycles is not optimal for the current operating conditions being experienced by the vehicle.

Furthermore, the control algorithm of Ferguson has no way of detecting how heavily loaded the vehicle is, however, and uses the same open-loop stepwise incrementation of 0.1 g per step for EBP control, regardless of whether the vehicle is operating in an LVW condition, as shown in FIG. 2, or in a heavily loaded GVW condition, as shown in FIG. 3. The inventors of the present invention have recognized that under GVW loading conditions, DRP is typically not needed and actually detrimentally reduces overall braking performance in vehicles such as light trucks. The approach of Ferguson, therefore results in inefficient use of available braking force, and unnecessarily and undesirably reduces overall braking force to less than it could be, at heavily loaded vehicle conditions.

One approach for providing true DRP in an RWAL type system is disclosed by commonly assigned U.S. patent application Ser. No. 10/624,056 filed concurrently herewith, to Bond, et al, which is incorporated herein by reference. Bond provides true DRP in an RWAL system through the use of a front wheel speed sensor. While the approach of Bond et al does provide true DRP and improved performance of an RWAL system, the addition of the front wheel speed sensor is undesirable in some applications. An alternative approach that provides an improved DRP function in an RWAL brake system without the need for a front wheel speed sensor would be desirable.

What is desired, therefore, is an improved apparatus and method for providing and operating a pump-less rear wheel anti-lock brake system, that addresses one or more of the problems described above.

SUMMARY OF THE INVENTION

Our invention provides an improved apparatus and method for operating a pump-less rear wheel anti-lock brake system by determining whether the vehicle is operating lightly loaded at a light vehicle weight (LVW) or heavily loaded at a gross vehicle weight (GVW), and controlling the brake system as a function of whether the vehicle is operating at LVW or GVW.

Some forms of our invention, provide rear dynamic proportioning (RDP) when a predetermined deceleration rate is exceeded during the braking event with the vehicle operating at LVW, and inhibiting RDP when the vehicle is operating at GVW.

The apparatus and method of our invention may also provide rear pressure control (RPC) during anti-lock braking.

In one form of our invention, a pump-less anti-lock brake apparatus is provided for controlling the rotational speeds, during a braking cycle, of only the rear brakes of a vehicle having at least one front and one rear wheel and front and rear brakes acting on the front and rear wheels respectively in response to a front and a rear brake pressure respectively. The pump-less brake apparatus includes a rear brake hydraulic circuit including a master cylinder for supplying a volume of pressurized brake fluid to the rear brakes during the braking cycle, a fluid storage element, and a rear brake pressure control (RPC) apparatus for controlling the rear brake circuit as a function of the rotational speed of at least one rear wheel and the rear brake pressure.

The RPC apparatus may include a rear brake pressure sensor, and a rear wheel speed sensor. The rear brake pressure sensor senses rear brake pressure at the rear brake and sends the signal to the RPC apparatus. The speed sensor is operatively connected for sensing a speed of the at least one rear wheel and sending a rear wheel speed signal to the RPC apparatus.

The RPC apparatus may also include a normally open apply valve and a normally closed release valve. The normally open apply valve has an inlet connected to the master cylinder for receiving pressurized fluid therefrom and an outlet connected to the rear brakes. The normally closed release valve has an inlet connected to the rear brakes for receiving fluid therefrom and an outlet connected to the fluid receiving element. The rear brake pressure sensor may be connected in fluid communication with the outlet of the apply valve and the inlet of the release valve for sensing rear brake pressure in the rear brake circuit between the outlet of the apply valve and the inlet of the release valve.

Our invention may also take the form of a method for controlling a rear brake hydraulic circuit having a fluid storage element and a master cylinder supplying a volume of pressurized brake fluid to the rear brakes during the braking cycle in a pump-less anti-lock brake apparatus controlling the rotational speeds, during a braking cycle, of only the rear brakes of a vehicle having left and right front and rear wheels and front and rear brakes acting on the front and rear wheels respectively. In one form of a method according to our invention, the method includes: determining whether the vehicle is operating lightly loaded at a light vehicle weight (LVW) or heavily loaded at a gross vehicle weight (GVW); providing rear dynamic proportioning (RDP) when a predetermined deceleration rate is exceeded during the braking event with the vehicle operating at LVW; and inhibiting RDP when the vehicle is operating at GVW.

The method may also include monitoring rear wheel speed, monitoring rear brake pressure, and controlling the rear brake circuit as a function of the rear wheel speed and the rear brake pressure. The method may further include controlling the rear brake circuit as a function of a volume available in the fluid storage device for receiving fluid supplied by the master cylinder during the braking cycle.

In some forms of a method according to our invention, the method may include monitoring rear brake pressure, determining a rear brake pressure rate (RBP Rate) from the rear brake pressure, and inhibiting RDP operation if the RBP Rate is less than a predetermined minimum value.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIGS. 6 and 7 are block diagrams of a method, according to the present invention;

DETAILED DESCRIPTION

Figure 5:
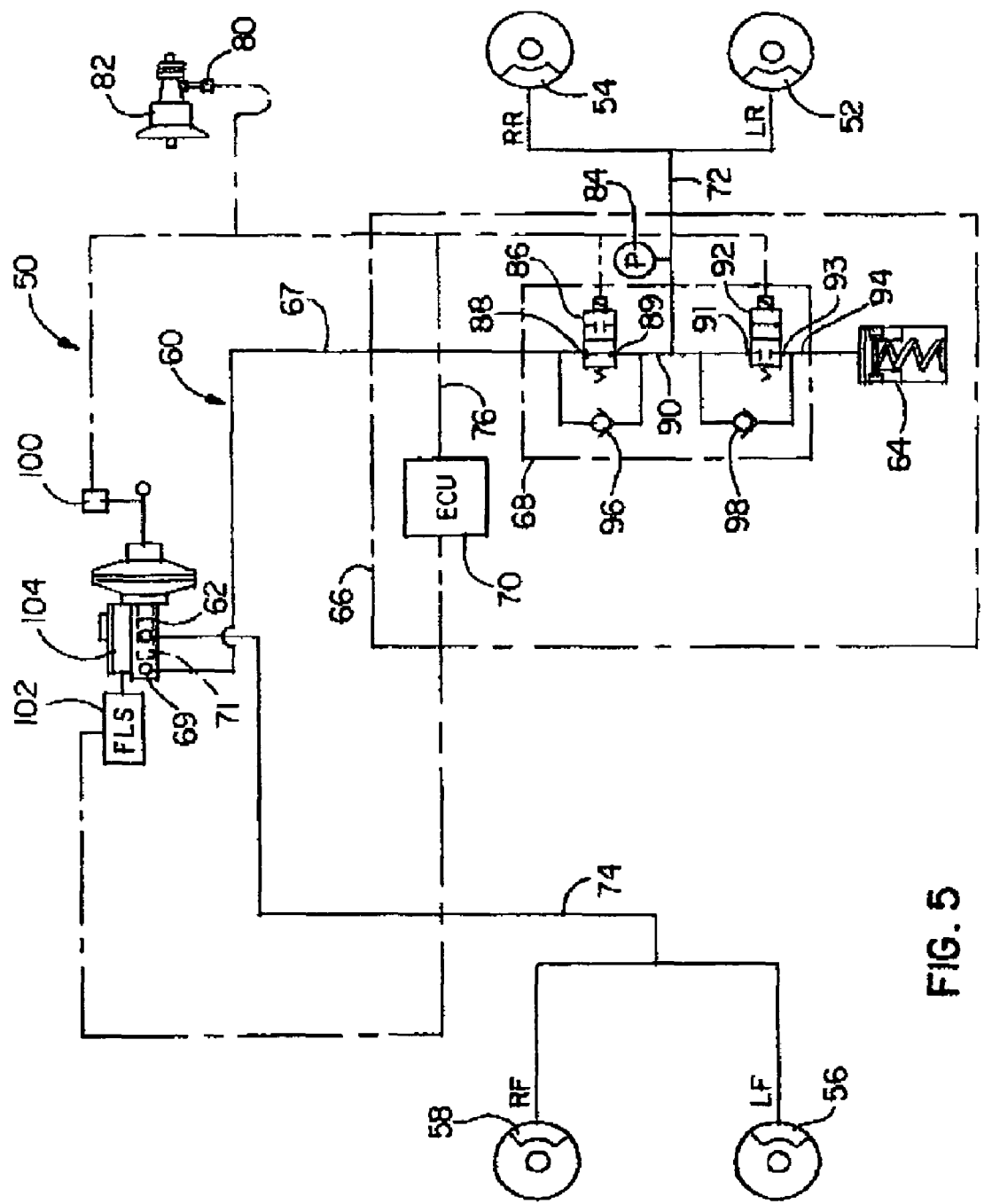
FIG. 5 is a schematic representation of an exemplary embodiment of the present invention.

FIG. 5 shows an embodiment of a pump-less anti-lock brake apparatus 50 for controlling the rotational speeds, during a braking cycle, of only the rear brakes 52, 54 of a vehicle having left and right front and rear wheels and front 56, 58 and rear brakes 52, 54 acting on the front and rear wheels respectively. The pump-less anti-lock brake apparatus 50 includes a rear brake hydraulic circuit 60, including a master cylinder 62 for supplying a volume of pressurized brake fluid to the rear brakes 52, 54 during the braking cycle, a fluid storage element in the form of an accumulator 64, and a rear brake pressure control (RPC) apparatus 66.

The RPC apparatus 66 includes a hydraulic control unit (HCU) 68 and an electrical control unit (ECU) 70, also referred to herein as the RPC controller. The HCU 68 is connected by a brake line 67 to a rear brake port 69 in fluid communication with a secondary piston 71 of the master cylinder 62. The HCU 68 is also connected via brake lines 72, 74 to the rear brakes 52, 54, and by a conduit 94 to the fluid storage element 64, for controlling the flow of pressurized fluid applied to the rear brakes 52, 54 during the braking cycle, and fluid flow to and from the fluid storage element 64. The ECU 70 is operatively connected, as indicated by dashed lines 76 to the HCU 68 for controlling the HCU 68 as a function of the rotational speeds of at least one front and one rear wheel.

The RPC apparatus 66 is operatively connected to a speed sensor 80 for sensing a speed of at least one of the rear wheels and sending a rear wheel speed signal to the ECU 70. In the exemplary embodiment shown in FIG. 5, the speed sensor 80 is connected to a rear wheel drive train component, in the form of a rotating component of the transmission or rear wheel differential 82. Our invention may be practiced with one rear wheel speed sensor 80, as shown in FIG. 5, or with individual sensors on each of the rear wheels. Where the second speed sensor 80 is provided in the form of a single rear wheel speed sensor 80 attached to a rear wheel drive train component 82, as shown in FIG. 5, the rear wheel speed sensed may be an average speed value for the rear wheels.

The RPC apparatus 66 further includes a rear brake pressure sensor 84 operatively connected for sensing rear brake pressure at the rear brakes 52, 54 and sending a signal to the ECU 70 of the RPC apparatus 66. The pressure sensor 84 preferably senses gage pressure applied to the rear brakes 52, 54, and generates an electrical signal representative of the instantaneous value of gage pressure at the rear brakes.

The HCU 68 of the exemplary embodiment 50 includes an apply valve 86 and a release valve 92, operatively connected to the ECU 70 to be controlled thereby. The apply valve 86 is a normally open valve having an inlet 88 connected via the line 67 to the master cylinder 62, for receiving pressurized fluid from the secondary piston 71. An outlet 89 of the apply valve 86 is connected to the rear brakes 52, 54 via lines 72 and 74, and an internal passage 90 of the HCU 68. The release valve 92 is a normally closed valve having an inlet 91 connected via the internal passage 90, and lines 72, 74 to the rear brakes 52, 54 for receiving fluid from the rear brakes 52, 54. An outlet 93 of the release valve 92 is connected, via a line or a second internal passage 94 in the HCU 68, to the accumulator 64. The rear brake pressure sensor 84 is connected in fluid communication with the fluid line 72, and the internal passage 90 connecting outlet 89 of the apply valve 18 to the inlet 91 of the release valve 20, for sensing rear brake pressure in the rear brake circuit 16 at a point between the outlet 89 of the apply valve 18 and the inlet 91 of the release valve 20.

The HCU 68 further includes a first and a second check valve 96, 98. The first check valve 96 is operatively connected between the inlet and outlet 88, 89 of the apply valve 86, for blocking fluid flow from the inlet to the outlet 88, 89 of the apply valve 86, and for passage of flow from the outlet to the inlet 89, 88 of the apply valve 86. The second check valve 98 is operatively connected between the inlet and outlet 91, 93 of the release valve 92, for blocking fluid flow from the inlet to the outlet 91, 93 of the release valve 92, and for passage of flow from the outlet to the inlet 93, 91 of the release valve 92.

The RPC brake apparatus 50 further includes a position sensor in the form of a brake switch 100, and fluid level sensor 102. The brake switch is operatively connected between the master cylinder 62 and the ECU 70, for sensing that a braking event has been initiated by a vehicle operator depressing a brake pedal, to generate fluid pressure in the master cylinder 62. The fluid level sensor 102 is operatively connected between a fluid reservoir 104 of the master cylinder 62 and the ECU 70 for sending system diagnostic information to the ECU 70.

Figure 6:
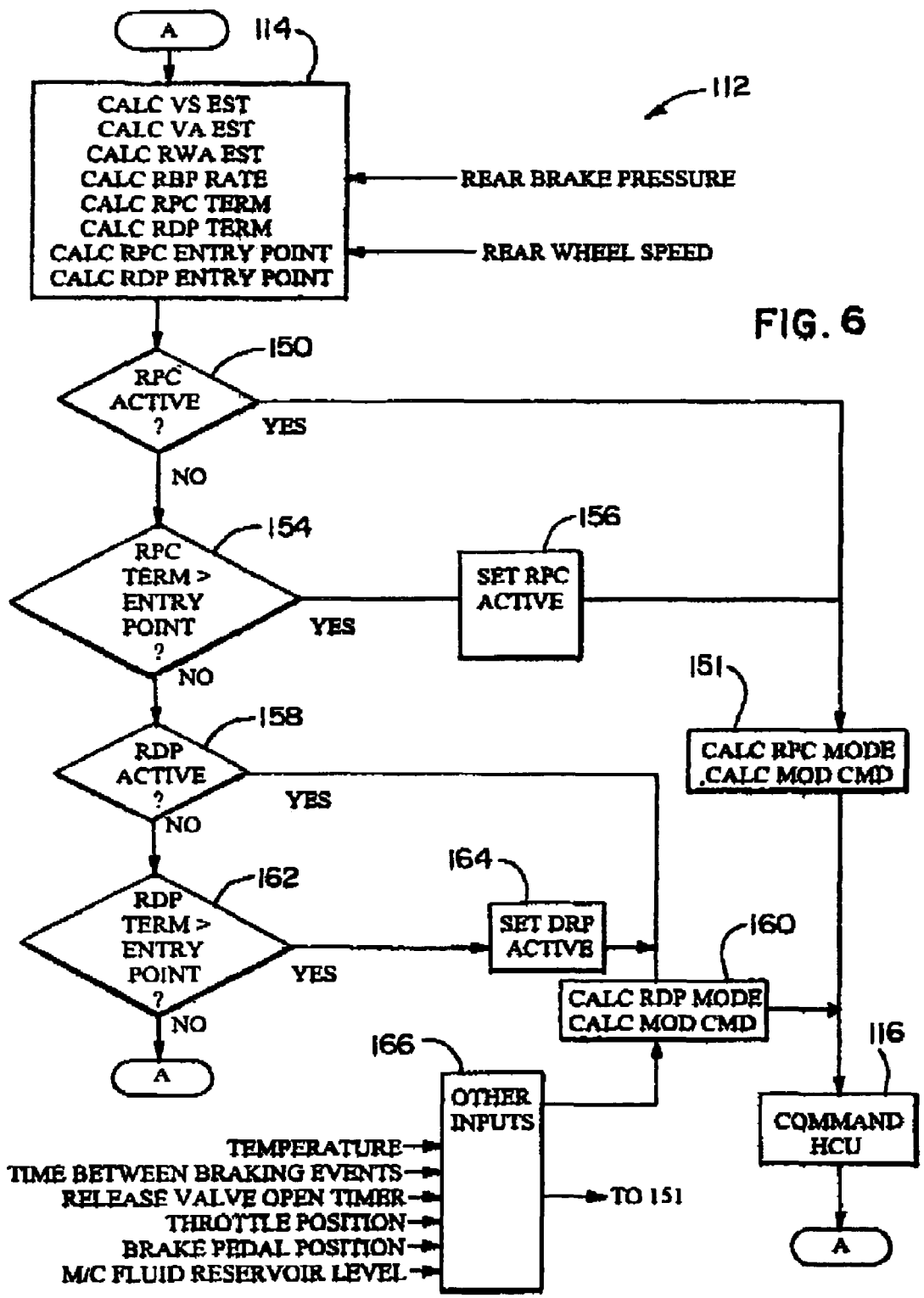

An exemplary method 112 for operating the exemplary embodiment of the pump-less braking apparatus 50, is illustrated in FIGS. 6 and 7. As shown at block 114 in FIGS. 6 and 7, the ECU 70 continually monitors the rear wheel speed and the rear brake pressure, as detected by the rear wheel speed sensor 80 and the rear brake pressure sensor 84, and calculates eight values that are used by the ECU 70 for generating a command to the HCU 68, as shown at block 116 of FIG. 6, for controlling the HCU 68 as a function of the rotational speed of the rear wheels and the rear brake pressure. These eight values are: an estimated vehicle speed (VS Est), calculated as a rate bounded function of the rear wheel speed; an estimated vehicle acceleration rate (VA Est), calculated as a rate controlled derivative of the vehicle speed estimate (VA Est); a rear wheel acceleration estimate (RWA Est); a rear brake pressure rate of change (RBP Rate); a RDP entry point, calculated as a function of vehicle speed (VS Est); a RDP term, calculated as a proportional difference between (VA est and RWA Est, modified as a function of whether the vehicle is operating at LVW or GVW; an RPC entry point, calculated as a function of the vehicle speed (VS Est); and an RPC term, calculated as a function of vehicle speed (VS Est) and rear wheel speed.

As shown at block 118, in FIG. 7, in addition to calculating the eight values described above, the ECU 70 also makes a determination with regard to the type of surface on which the vehicle is operating, from rear wheel speed signal. Where a rough road surface is detected, the ECU 70 modifies the RPC entry point, generally in a manner delaying entry into RPC. In one embodiment of the invention, the ECU 70 monitors noise on the wheel speed signals generated by the wheel speed sensor 80. When the vehicle is operating on a smooth road surface, the signals received from the wheel speed sensors 80 exhibit only a small noise component. As the road surface becomes progressively rougher, the noise component increases. The ECU 70 makes use of this noise component to estimate the type of surface that the vehicle is operating on, and if necessary, modifies the RPC entry point to compensate for the road surface in the command generated at block 116 for controlling the HCU 68.

Although the RDP term and RDP entry point can be calculated in any suitable manner, the exemplary method 112 includes calculating the RDP term by first calculating the vehicle speed estimate (VS Est), as shown at block 120, and then calculating the vehicle acceleration estimate (VA Est), and the rear wheel acceleration (RWA Est), as functions of the vehicle speed (VS Est), as shown at blocks 122 and 124 of FIG. 7. The RDP term is then calculated, as shown at block 126, as a proportional difference between the RWA Est and VA Est.

If the vehicle is operating at a GVW rather than an LVW loading condition, as shown at decision diamond 128, the RDP term is then modified, as shown at block 130. If the vehicle is not operating at GVW, the RDP term is not modified.

Figure 8:
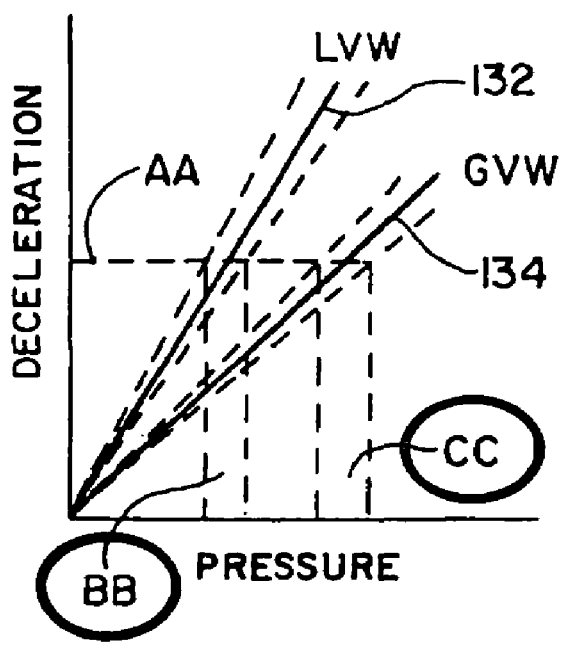
FIG. 8 is a graph showing the relationship of deceleration to rear brake pressure for a vehicle operating at LVW and GVW loading conditions.
Figure 3:
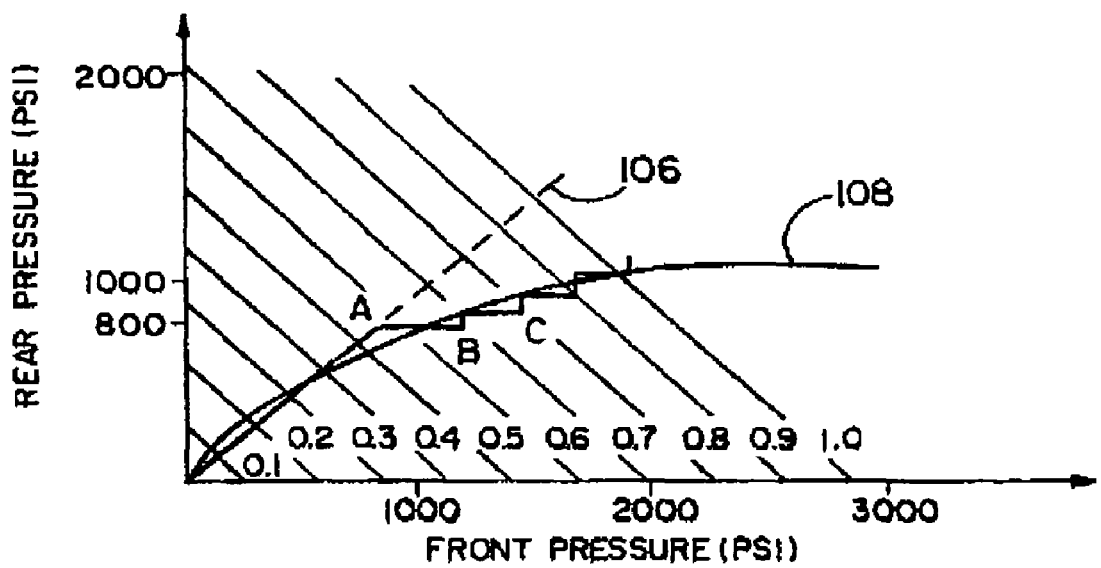
FIGS. 3 and 4 are graphs representing operation of a prior RWAL brake apparatus having an electronic brake proportioning (EBP) subroutine as part of the RWAL operating algorithm.
Figure 4:
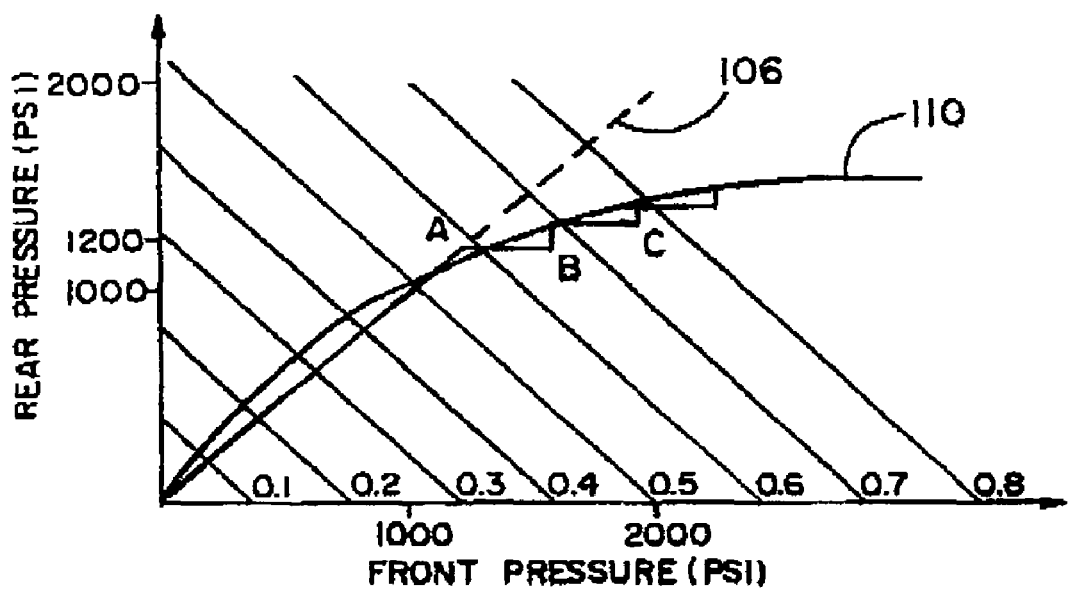

In the exemplary embodiment, the process of determining whether the vehicle is operating at LVW or GVW is performed by the ECU 70, using the rear brake pressure as reported by the rear brake pressure sensor 84, and the vehicle deceleration rate (VA Est) as calculated from the rear wheel speed as reported by the rear wheel speed sensor 80. FIG. 8 is a graph showing the relationship between deceleration and rear brake pressure for a vehicle when operating under LVW conditions on curve 132, and for the same vehicle operating under GVW conditions on curve 134.

A pressure/deceleration characteristic, similar to the one shown in FIG. 8, can be determined for a given vehicle through system modeling, or torque wheel testing. From the vehicle dynamics, and from brake balance requirements supplied by the vehicle manufacturer, the deceleration at which it is desired to begin limiting rear brake pressure at LVW can be determined as a function of vehicle speed VS Est. As shown at block 135, once the deceleration at which RDP should start is determined, the ECU 70 calculates the RDP entry point as a function of VS Est.

As will be readily seen from the graph of FIG. 8, for a given speed and desired deceleration, as shown by the dashed line at AA, the vehicle requires more rear brake pressure to stop when operating loaded at GVW than it does when operating at LVW. The rear pressure sensor 84 of the exemplary embodiment 50 of a brake apparatus according to our invention can readily detect whether the rear brake pressure is in the range indicated by the pressure range labeled as BB, indicating operation at LVW, or whether the vehicle is operating in a higher pressure range labeled as CC, indicating that the vehicle is operating at GVW.

The ECU 70 compares the rear brake pressure measured by the rear brake sensor 84 and the vehicle deceleration calculated at block 122 of FIG. 7 with a deceleration/pressure characteristic for the vehicle, stored as a look up table, or from an equation in the ECU 70, to determine if the vehicle is operating at LVW or GVW. If the pressure to achieve the calculated deceleration (VA Est) is in the lower range B, the vehicle is operating at LVW and the unmodified RDP term calculated at block 126 is utilized by the process shown in FIG. 6 to generate a command to the HCU 68 that will energize and close the normally open apply valve 18 to hold the rear pressure from increasing, as shown by section 138 of the upper curve 136 in FIG. 9, if the steps indicated in FIG. 6 indicate that RDP operation is desirable. Conversely, if the pressure to achieve the calculated deceleration (VA Est) is in the upper range C, the vehicle is operating at GVW and the RDP term calculated at block 126 is modified in a manner that causes the ECU 70 to generate a command to the HCU 68 that leaves the normally open apply valve 18 open, and thereby allows the full brake pressure generated by the master cylinder to be delivered through the apply valve 18 to the rear brakes, as shown by the lower curve 140 in FIG. 9, during RDP operation.

The ability of a brake system, according to our invention, to make a pre-selection prior to beginning RDP operation on the basis of whether the vehicle is operating at LVW or GVW provides maximized use of available braking force when the vehicle is operating in a heavily rear loaded condition, and provides significant advantages over RWAL systems that do not have any form of rear brake proportioning capability.

The exemplary method 112, of FIGS. 6 and 7, provides rear pressure control (RPC) of the rear brake circuit, in addition to providing the RDP function. Although the RPC term and RPC entry point can be calculated in any suitable manner, the exemplary embodiment of the method 112 discloses calculating the RPC entry point as a function of vehicle speed (VS Est), as shown at block 142, and calculating the RPC term as a function of vehicle speed and rear wheel speed, as shown at block 144 of FIG. 7. The method 112 further includes modifying the RPC entry point as a function of a rough road condition, if a threshold rough road condition is exceeded, as indicated by decision diamond 146 and block 148.

During a braking event consisting of a single stroke of the master cylinder, the ECU 70 continually iterates at a rapid rate through the steps of the method 112, as shown in FIG. 6, using the eight values discussed above, which are also continually updated, as shown in FIG. 7. As shown at diamond 150, if RPC is already active, the ECU 70 will use the eight values to calculate whether the brake apparatus 50 should continue in RPC mode, ("CALC RPC MODE"), and if so what commands should be given to the HCU 68 ("CALC MOD CMD"), for controlling the apply and release valves 86, 92, as shown at block 151.

If RPC is not active, the ECU 70 determines if the RPC term is greater than the RPC entry point, as shown at diamond 154. If the RPC term is greater than the RPC entry point, the ECU 70 sets an 'RPC ACTIVE' flag, as shown in block 156, and proceeds to block 151, as shown in FIG. 6.

If the RPC term is not greater than the RPC entry point, as determined at diamond 154, the ECU 70 determines whether or not RDP is already active, as shown at diamond 158. If RDP is already active, the ECU 70 will use the eight values determined at block 112 to calculate whether the brake apparatus 50, should continue in RDP mode, and if so what commands should be given to the HCU 68 for controlling the apply and release valves 86, 92, as shown at block 160.

If RDP is not already active, as determined at diamond 158, the ECU 70 determines whether or not the RDP term is greater than the RDP entry point, as shown at diamond 162. If the RDP term is greater than the RDP entry point, the ECU 70 sets a 'RDP ACTIVE' flag, as shown in block 164, and proceeds to block 160, as shown in FIG. 6.

Figure 9:
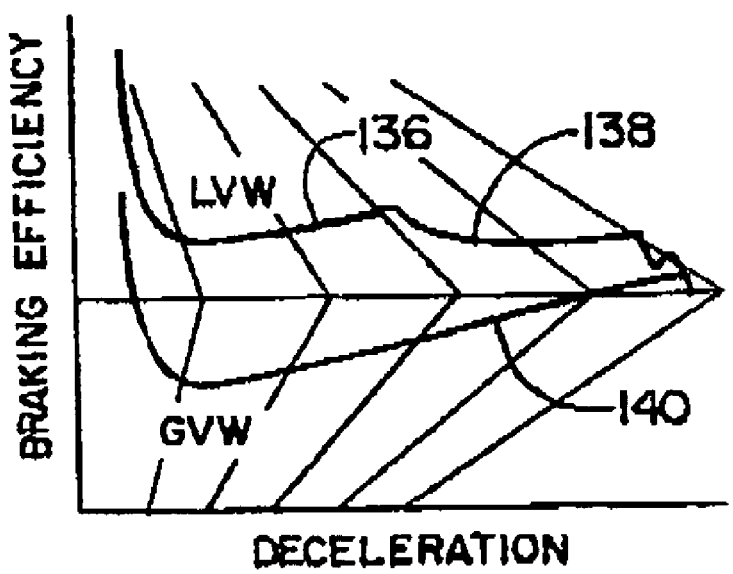
FIGS. 9 and 10 are graphs representing operation of the present invention in a RDP mode and in an RPC mode, respectively.
Figure 10:
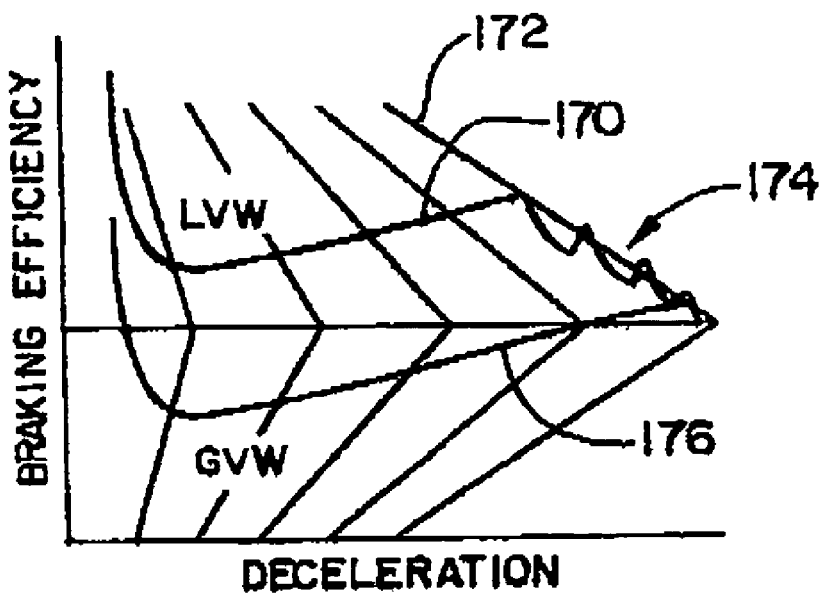

FIG. 10 shows the braking efficiency vs. deceleration performance for the same vehicle as shown in FIG. 9, but operating without the RDP function provided by our invention. When operating at LVW, without RDP according to our invention, the rear brake pressure increases, as shown in curve 170, until the rear wheels reach the adhesion limit 172 of the surface on which the vehicle is operating. Once the RPC system detects that the rear wheel is approaching a slip condition, the HCU of the RPC system will carry out repeated hold and release cycles, as shown by curve 174, until the braking event ends.

Where the vehicle operating at LVW is extremely rear biased, i.e. large rear braking capacity to handle a GVW load resulting in too much braking on the rear wheels at LVW, the pressure cycling will begin at very low deceleration levels. In prior RWAL systems without the RDP and RPC functions provided by our invention, this pressure cycling generated an annoying pedal feedback that could be felt by the driver.

In an apparatus or method according to our invention providing both RDP and RPC, the DPR mode is entered at LVW, under appropriate conditions, to proportionally reduce pressure applied to the rear brakes and delay entry into the RPC mode, to thereby eliminate much of the annoying pedal feedback and conserve the limited supply of brake fluid available from the master cylinder 62. We also specifically note that, even in RPC mode, RPC operation can be modified or totally inhibited, when the vehicle is operating at GVW as shown in the lower curve of FIG. 10, to thereby conserve hydraulic fluid supplied by the master cylinder 62 and storage capacity of the accumulator 64, and to totally eliminate annoying pedal feedback, where a desired braking performance can be achieved at GVW without RPC.

Figure 1:
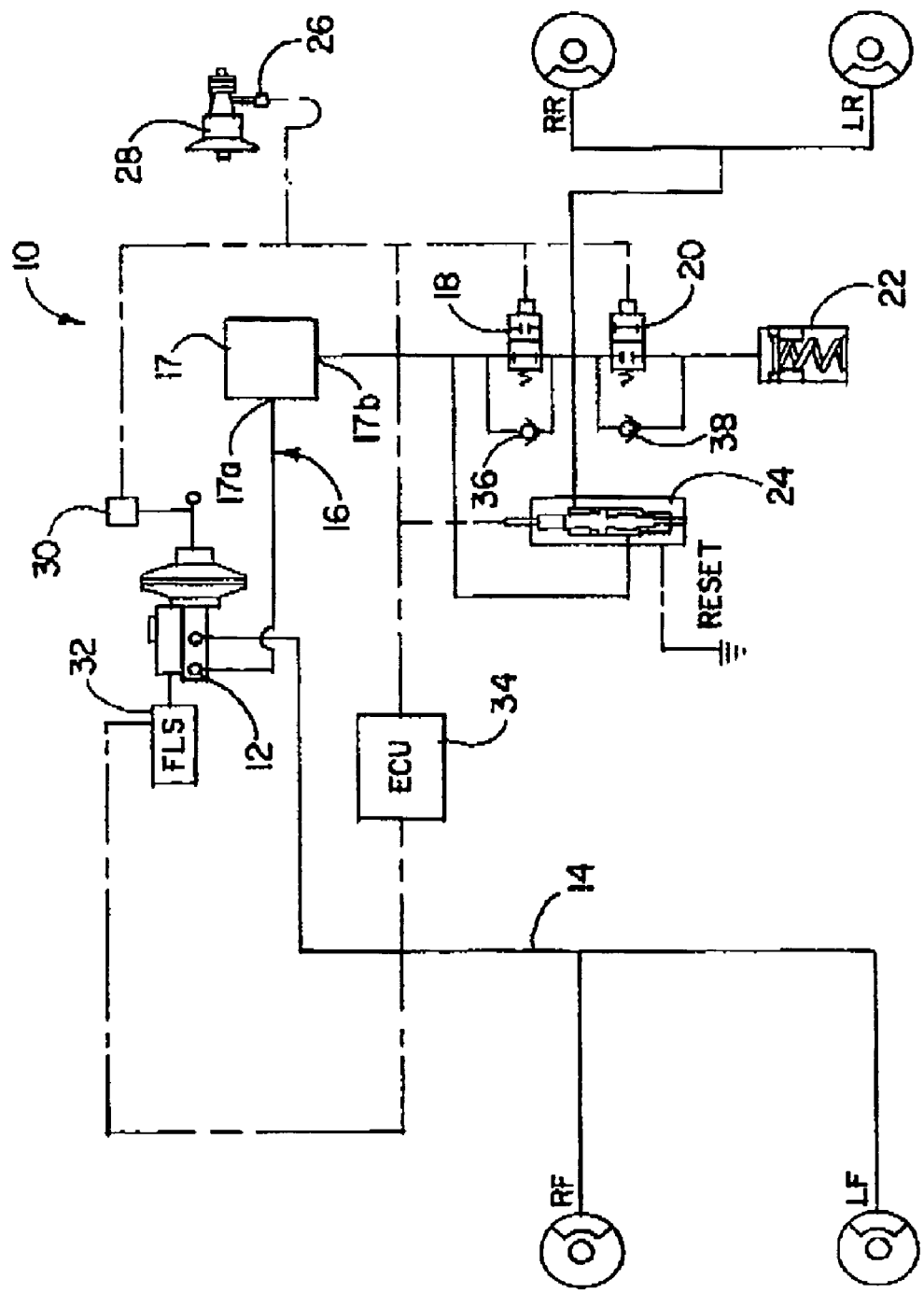
FIG. 1 is a schematic representation of a prior RWAL brake apparatus.
Figure 2:
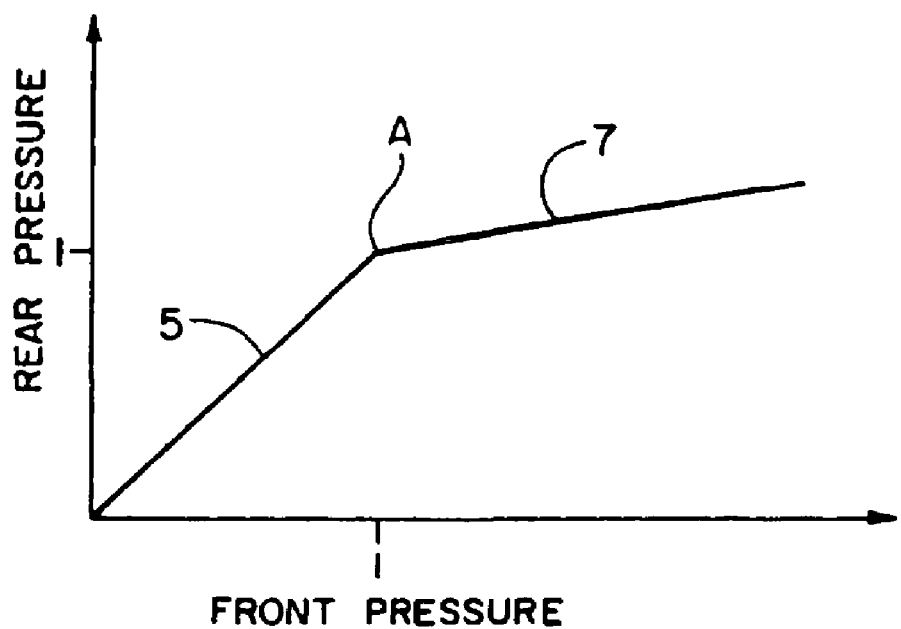
FIG. 2 is a graphical representing operation of a prior hydraulic proportioning valve.

Those skilled in the art will readily recognize that embodiments of our invention incorporating the rear brake pressure sensor 84, as shown in FIG. 5, provide significant advantages over prior RWAL systems using a differential pressure switch 24, as shown in FIG. 1. These advantages flow from the fact that the pressure sensor 84 provides a means for continually monitoring the instantaneous pressure being actually applied to the rear brakes, and the ability to calculate the rate of decay or increase in rear brake pressure, i.e. RBP Rate as shown in FIGS. 6 an 7.

The differential pressure switch 24 of prior RWAL systems does not provide any means for monitoring actual rear brake pressure for determining a rate of decay or increase in rear brake pressure. The RWAL differential pressure switch 24 only supplies an electrical signal when a singular differential pressure condition exists between the pressure supplied to the rear brake circuit 16 by the master cylinder 12 and the pressure at the rear brakes, and thus cannot be used for the enhanced system control and diagnostic functions provided by the pressure switch 84 of a brake apparatus according to our invention. Also, the singular differential pressure condition detected by the RWAL differential pressure switch 24 is predetermined by the mechanical design and selection of components inside the differential pressure switch 24, and cannot be changed or modified without replacing components within the differential pressure switch 24.

The pressure sensor 84 of our invention provides considerably improved controllability in both the RDP and RPC modes of operation, in comparison to prior RWAL systems with differential pressure switches 24.

In addition to being used for determining whether the vehicle is operating at LVW or GVW, as described above, the rear brake pressure and rear brake pressure rate RBP RATE calculated at block 112 are also utilized at blocks 151 and 160 for several other functions that provide significantly enhanced performance and reliability, in comparison to prior RWAL systems using only a differential pressure switch 24 as shown in system 10 of FIG. 1.

The rear pressure sensor 84 provides enhanced capability for determining exit criteria for leaving RPC operation. At the end of a stop utilizing controlled braking in a rear wheel drive vehicle, it is important to maintain sufficient brake pressure at the rear brakes to keep the rear wheels from spinning due to powertrain torque on a slippery surface while the driver is maintaining pressure on the brake pedal. If too much of the pressurized fluid available from the master cylinder 62 has been released during rear wheel anti-lock braking operation, and the engine has not yet returned to idle speed, there will not be enough braking force available to keep the rear wheels from spinning when the driver releases the brake, and the driver will have to reapply the brakes to keep the rear wheels from starting to spin up when RPC operation is terminated.

In a conventional RWAL system 10, such as the one shown in FIG. 1, a differential pressure switch 24 is used to determine a differential between the pressure supplied to the rear brake circuit 16 by the master cylinder, and the rear brake pressure. When this pressure differential has dropped to a predetermined minimum value following a release of the brake by the vehicle operator, such as master cylinder pressure falling to within 10 bar of the rear brake pressure, RWAL operation is terminated. If too much pressurized fluid has been bled off through the release valve 20 by the RWAL system 10 during hold and release cycling, however, before the driver releases the brake, because the release valve 20 has malfunctioned or has been held open for too much time during the braking cycle, the differential pressure switch 24 cannot determine that apply valve 18 needs to be opened and the release valve 20 closed to hold or reapply pressure to the rear brakes. The RWAL system 10 has to rely on correctly interpreting speed signals from the rear wheel speed sensor 26 to determine that the rear wheels are starting to spin up while the vehicle is stopped, in order to know that it must take further action to exit from RWAL operation and reapply braking pressure from the master cylinder to the rear brakes. This may require that one or more additional hold and release cycles be performed by the RWAL system, to accurately ascertain vehicle speed. There may not be enough fluid available to perform these cycles, or the accumulator 22 may not have enough capacity to allow proper hold and release cycling of the RWAL.

In embodiments of a braking system according to our invention, such as the one shown in FIG. 5, having a rear pressure sensor 84, however, the RPC system 50 will always know whether there is enough pressure to hold the rear wheels stationary because the actual rear brake pressure is used for control functions, rather than a singular pre-selected value of differential pressure as was the case in prior RWAL systems. When the driver releases the brake, fluid in the rear brakes and accumulator 64 bleeds off and flows back to the master cylinder 62 through the check valves 96, and 98 in parallel with the apply and release valves 86, 92 respectively. The check valve function may also be provided by pressure release around lip seals in the apply and release valves 86, 92, as is known in the art, rather than with separate spring loaded ball check valves 96, 98 of the type indicated schematically in FIG. 5.

The ECU 70 can be programmed to exit RPC operation when the rear pressure has dropped to a particular minimum value, which may be modified in accordance with other operating parameters, while the system is operating, or during initial set-up of the system for a particular vehicle, without the disassembly and replacement of components required in RWAL systems where differential pressure switches 24 were used. In addition, the RBP RATE can be used to determine that pressure in the rear brake is decaying, indicating that the driver has released the brake and the master cylinder pressure in the rear brake circuit 60 has dropped below rear brake pressure, and is allowing rear brake pressure to bleed off through the check valve 96.

The pressure sensor 84 also provides the ability to determine how much fluid has been released to the accumulator 64 during controlled braking operation. By using known pressure-volume characteristics of the accumulator 64 and other rear brake circuit components, the accumulator state can be determined far more accurately than was possible in prior RWAL systems using only differential pressure switches, and the control strategy can be changed if it is determined that the accumulator 64 is reaching the limits of its capacity and cannot absorb the fluid that would be released in additional extended openings of the release valve 92.

Knowing the actual rear brake pressure and RBP Rate also provides additional diagnostic capability for detecting failures of components in the braking apparatus. For example, the apply valve 86 can be tested for leakage during a RDP event, to determine if it is failing to prevent master cylinder pressure from reaching the rear brakes, by monitoring whether the rear brake pressure and/or RBP Rate increases while both the apply and release valves 86, 92 are closed. In similar fashion, the release valve 92 can be tested for leakage during a RDP event, by monitoring whether the rear brake pressure drops during a hold event, or to determine if it is stuck closed by monitoring whether the rear brake pressure does not drop during a release event.

As shown in FIG. 6, in some embodiments of our invention the ECU 70 also receives additional inputs 166 from dedicated sensors or a vehicle bus for further enhancing control of the rear brakes during RPC an/or RDP operation. Such inputs may include ambient or fluid temperature, throttle position, brake pedal travel, time that the apply and release valves operated in open and closed states during the braking event, elapsed time since the last braking event, etc.

These additional values are used for a number of performance enhancing functions, such as estimating how much of the pressurized volume of fluid is available from the master cylinder 62 during the remainder of the present braking event, and how much fluid the accumulator 64 is currently holding. The temperature of the fluid and the known fluid flow characteristics of the various components of the rear brake hydraulic circuit 60 are utilized by the ECU 70 for making calculations relating to the amount of fluid that remains available for the present braking event.

If there is not a sufficient volume available of pressurized fluid to perform RPC or RDP as commanded by blocks 160 or 151, the command actually sent to the HCU 68 at block 116 may be modified. If the accumulator 64 has not had sufficient time to completely empty following the preceding braking event, the ECU 70 may delay entry into RDP or RPC for a short period of time, to allow the accumulator 64 to completely discharge any fluid still stored therein through the relief valves 96, 98, and thereby be available for storing a maximum capacity of fluid released by the release valve 92 during the current braking event.

By estimating the available capacity in the accumulator for receiving fluid during RPC and/or RDP operation, and modifying the commands sent to the HCU 68 accordingly, the limited amount of pressurized fluid available for a given braking event can be meted out more effectively and efficiently than was the case in prior RWAL systems.

The various components of the RPC 66, such as the ECU 70, HCU 68 and the accumulator 64 may be packaged and mounted in a variety of combinations and locations to suit the needs of a particular vehicle application. For example, the ECU 70 and HCU 68 may be packaged and mounted together as one unit, affixed to the chassis. Alternatively, the ECU 70 and HCU 68 may be packaged separately and mounted remotely from one another, of the components and/or functions of the ECU 70 and HCU may be combined with other on-board computers or hydraulic control units. Either the ECU 70 and/or the HCU may also be mounted directly on the master cylinder.

While the embodiments of the present invention disclosed herein are presently considered to be preferred, various changes and modifications can be made without departing from the spirit and scope of the invention. For example, although the pressure sensor 84 is preferred because of the enhanced operational and diagnostic capability that it provides, other types of sensors including load cells, strain gages, weight-on wheels switches, etc., may be used instead of, or in addition to, the pressure sensor 84 for determining whether the vehicle is operating at LVW or GVW.

The scope of the invention is indicated in the appended claims. It is intended that all changes or modifications within the meaning and range of equivalents are embraced by the claims.

We claim:

1. A method for controlling a rear brake hydraulic circuit having a fluid storage element and a master cylinder supplying a volume of pressurized brake fluid to the rear brakes during the braking cycle in a pump-less anti-lock brake apparatus controlling the rotational speeds, during a braking cycle, of only the rear brakes of a vehicle having at least one front wheel, at least one rear wheel, and front and rear brakes acting on the front and rear wheels respectively, the method comprising:
   determining whether the vehicle is operating lightly loaded at a light vehicle weight (LVW) or heavily loaded at a gross vehicle weight (GVW) as a function of the rotational speed of at least one rear wheel and the rear brake pressure;
   providing rear dynamic proportioning (RDP) when a predetermined deceleration rate is exceeded during the braking event with the vehicle operating at LVW;
   monitoring rear brake pressure; and
   determining a rear brake pressure rate (RBP Rate) from the rear brake pressure; inhibiting RDP when the RBP rate is less than a predetermined value; and
   inhibiting RDP when the vehicle is operating at GVW.

2. The method of claim 1 further comprising:
   monitoring rear wheel speed;
   and
   controlling the rear brake hydraulic circuit as a function of the rear wheel speed and the rear brake pressure.

3. The method of claim 1 further comprising:
   monitoring rear wheel speed;
   determining a vehicle speed (VS Est) as a function of rear wheel speed; and
   determining an RDP entry point as a function of the vehicle speed (VS Est).

4. The method of claim 3 further comprising:
   determining a vehicle acceleration (VA Est), and a rear wheel acceleration (RWA Est) from the rear wheel speed;
   determining an RDP term as a function of the vehicle acceleration (VA Est) and rear wheel acceleration (RWA Est) for a vehicle operating at LVW.

5. The method of claim 4 further comprising determining if the RDP term indicates operation of the vehicle at GVW.

6. The method of claim 5 further comprising:
   and
   determining if the vehicle is operating at LVW or GVW as a function of rear brake pressure and vehicle acceleration (VA Est).

7. The method of claim 1 further comprising providing rear pressure control (RPC) of the rear brake hydraulic circuit.

8. The method of claim 7 further comprising:
   calculating an RPC entry point as a function of vehicle speed (VS Est);
   calculating an RPC term as a function of the vehicle speed; and
   controlling the rear brake hydraulic circuit as a function of the RPC term and RPC entry point.

9. The method of claim 8 wherein the RPC term is calculated as the proportional and derivative difference between the vehicle speed (VS Est) and the rear wheel speed.

10. The method of claim 9 further comprising:
    determining a road surface condition; and
    modifying the RPC entry point as a function of the road surface condition.

11. The method of claim 10 comprising determining the road surface condition as a function of variations of the rear wheel speed.

12. The method of claim 1 further comprising controlling the rear brake hydraulic circuit as a function of a volume available in the fluid storage element for receiving fluid supplied by the master cylinder during the braking cycle.

* * * * *